(12) United States Patent
Oberman

(10) Patent No.: US 6,881,273 B1
(45) Date of Patent: Apr. 19, 2005

(54) EYEWEAR CLEANING DEVICE

(76) Inventor: Charles D. Oberman, 17 Marine Ter., Lake Hopatcong, NJ (US) 07849

(*) Notice: Subject to any disclaimer, the term of this patent is extended or adjusted under 35 U.S.C. 154(b) by 204 days.

(21) Appl. No.: 10/126,081

(22) Filed: Apr. 19, 2002

Related U.S. Application Data

(60) Provisional application No. 60/284,807, filed on Apr. 19, 2001.

(51) Int. Cl.[7] .................................................. B08B 7/00
(52) U.S. Cl. ........................ 134/6; 15/209.1; 15/210.1; 206/5; 206/6; 206/38
(58) Field of Search .................. 206/5, 6, 38; 15/208, 15/209.1, 210.1, 214; 134/6

(56) References Cited

U.S. PATENT DOCUMENTS

| | | | | |
|---|---|---|---|---|
| 1,339,330 A | * | 5/1920 | Goelkel ............................ 206/6 |
| 2,332,266 A | * | 10/1943 | Segal ............................... 206/6 |
| 2,458,015 A | * | 1/1949 | McDonald ...................... 15/214 |
| 2,650,700 A | * | 9/1953 | Wolf ................................ 206/5 |
| 2,739,698 A | * | 3/1956 | Baratelli ......................... 206/5 |
| 3,545,603 A | * | 12/1970 | Warsager ......................... 206/5 |
| 3,647,059 A | * | 3/1972 | Humphreys ................. 242/564 |
| 4,267,923 A | * | 5/1981 | Baratelli et al. ................ 206/5 |
| 4,269,306 A | * | 5/1981 | Feniger ........................... 206/5 |
| 4,342,128 A | | 8/1982 | Doyle |
| 4,437,624 A | * | 3/1984 | Rosenberg ................... 242/381 |
| 4,854,449 A | * | 8/1989 | Fitzhugh ....................... 206/37 |
| 5,000,204 A | * | 3/1991 | Smith .............................. 134/6 |
| 5,083,661 A | * | 1/1992 | Burwell ......................... 206/37 |
| 5,150,504 A | | 9/1992 | Cohen |
| 5,344,002 A | * | 9/1994 | Baczkowski .................... 206/5 |
| 5,439,104 A | * | 8/1995 | Wolska-Klis ............... 206/233 |
| 5,444,890 A | * | 8/1995 | Higginson ................... 15/214 |
| 5,626,224 A | * | 5/1997 | Clark et al. ..................... 206/5 |
| 5,694,659 A | | 12/1997 | Merrion |
| 5,718,310 A | * | 2/1998 | Gallo ..................... 191/12.2 R |
| 5,782,708 A | | 7/1998 | Kimball, Jr. |
| 5,829,088 A | * | 11/1998 | Ujihara et al. ................ 15/211 |
| 5,878,873 A | * | 3/1999 | Clark .............................. 206/6 |
| 5,898,472 A | | 4/1999 | Oshikawa |
| 5,921,383 A | * | 7/1999 | Shefler et al. .................. 206/5 |
| 5,971,238 A | | 10/1999 | Malvasi et al. |
| 6,115,841 A | | 9/2000 | Thompson, II et al. |
| 6,131,209 A | | 10/2000 | Thayer et al. |
| 6,145,655 A | * | 11/2000 | Tsai ............................... 206/38 |
| 6,439,379 B1 | * | 8/2002 | Taormina ....................... 206/5 |
| 6,817,468 B1 | * | 11/2004 | Horesh ......................... 206/37 |
| 2002/0000455 A1 | * | 1/2002 | Condliff et al. ............ 224/162 |
| 2003/0121114 A1 | * | 7/2003 | Waite ............................ 15/28 |

\* cited by examiner

*Primary Examiner*—Frankie L. Stinson
(74) *Attorney, Agent, or Firm*—Lerner, David, Littenberg, Krumholz & Mentlik, LLP

(57) ABSTRACT

An eyewear cleaning device and method provides convenient cleaning of various types of eyewear, such as glasses and sunglasses. The eyewear cleaning device comprises a housing with a retractable cord, at the end of which is attached a soft, nonabrasive cloth for cleaning eyewear lenses. A cleaning fluid dispenser may be included with or attached to the housing. The device can be attached to clothing or other items in proximity to the user of the device, such as a dashboard, sports bag or backpack.

44 Claims, 4 Drawing Sheets

EYEWEAR CLEANING DEVICE

CROSS-REFERENCE TO RELATED APPLICATIONS

The present U.S. patent application claims the benefit of U.S. Provisional Patent Application No. 60/284,807 filed on Apr. 19, 2001, the contents of which is hereby incorporated by reference.

BACKGROUND OF THE INVENTION

The present invention relates to the cleaning of eyewear and more particularly to an improved, readily accessible device for the cleaning of eyewear such as glasses, sunglasses, ski goggles and the like.

Sunglasses are quite popular in today's society. They are worn for many reasons, including vision correction, style, general eye protection, sun protection and reduction in glare while driving or playing sports. A major problem that is encountered by persons who wear sunglasses is the fact that they become dirty or smudged and therefore require cleaning.

Many ways of cleaning sunglasses and other eyewear are known, but most methods are problematic for one reason or other. For instance, one way to clean sunglasses is to wash the sunglasses with water or a cleaner. Of course, this is a problem if you are not near a sink or a water supply, do not have soap or other cleaner, and do not have a towel or cloth to dry off the glasses. Moreover, for those who wear sunglasses and eyewear when engaged in outdoor activities, finding a sink or water to clean one's eyewear may be difficult.

More recently, many eyewear and sunglass retailers offer eyewear cleaning kits, which typically include a small spray bottle of liquid cleaner and a soft chamois. To keep these items together, a small pouch or case is often provided. While such cleaning kits work well to clean sunglasses and the like, other problems are created. For instance, one has to remember to take the cleaning kit whenever the glasses are worn. One also must have a place to store these items. Oftentimes, one may not have a pocket or be able to carry a pocketbook to hold these items. Moreover, one can easily lose the small bottle and/or cloth if they are left behind somewhere or fall out of a pocket or pocketbook.

It is easy to see how the problem of cleaning eyewear such as sunglasses becomes more acute in the area of sports. When engaged in outdoor sports where one desires to wear sunglasses, such as in soccer, tennis, cycling, volleyball, skiing, etc., there is a need to quickly and readily clean the glasses so as not to interrupt the sports activity. For example, when skiing or snowboarding, a skier's or snowboarder's goggles can become fogged or dirty from the snow and dirt. If the goggles are not readily cleaned, it reduces the wearer's ability to see the ski slopes and could lead to a dangerous situation. The same is true for other sports such as cycling. In these situations, one way to clean one's sunglasses or goggles is to use an article of clothing attached to one's body, such as the bottom of a shirt. This can be a problem, however, if the shirt is abrasive or of a material that does not readily clean the lenses. The dirt on the sunglasses can also cause problems by staining the shirt or other article of clothing being used to clean the sunglasses. A shirt can also become stretched out of shape during the cleaning process.

SUMMARY OF THE INVENTION

With all of the problems associated with the need to keep eyewear clean, there is a great need for an improved eyewear cleaning device which is readily accessible, not easily lost, can be carried on or in close proximity to a body of a person, and overcomes the above problems associated with the cleaning of such eyewear.

To solve the aforementioned problems, in a preferred embodiment, the present invention provides an eyewear cleaning device with a housing to which a fastener is connected for attaching the device to an article of clothing or some other object. A retractable cord is extendable from the housing, which includes an automatic retractable cord mechanism for automatically retracting the cord. At the end of the cord is attached a nonabrasive cloth or chamois for cleaning eyewear. In a preferred embodiment, the nonabrasive cloth is removably attached to the end of the cord. More preferably, the method of attachment is by a cloth fastener such as a clip or ring.

The fastener for connecting the housing to an object may be one of many known fastening devices, such as a clip, magnet, hook, eyehook, ring or crevice fastener. In another embodiment, the fastener device may be an opening for accepting a support element. In yet another embodiment, the fastener may be a protrusion on or part of the housing adapted to engage a support element. In one embodiment, a support element is provided having a portion adapted to engage an opening or protrusion of the housing and another portion adapted to attach to an object. The support element can be attached to the object by glue or adhesive tape. In yet another embodiment, the support element is merely a part of an object that is capable of engaging a protrusion or opening of a particular shape and size.

In other embodiments, more than one fastener may be used in connection with the eyewear cleaning device. In a preferred embodiment, a belt clip is used in combination with another type of clip. In yet another embodiment, a magnet is used in combination with a ring.

In another embodiment, the eyewear cleaning device includes an element for holding eyewear. For example, the nonabrasive cloth may be in the form of or also contain a pouch for holding the eyewear. In yet another embodiment, a holder, such as an eyehook, ring or opening on the housing is used as a holder for eyewear.

In yet another embodiment, the present invention provides an eyewear cleaning device with a housing to which a crevice fastener is connected for attaching the device to an object by inserting the fastener into a crevice on the object. A retractable cord is extendable from the housing, which includes an automatic retractable cord mechanism for automatically retracting the cord. At the end of the cord is attached a nonabrasive cloth or chamois for cleaning eyewear. The nonabrasive cloth may be removably attached to the end of the cord. The eyewear cleaning device may include various manners of holding the eyewear, such as the nonabrasive cloth forming a pouch, or a hook, eyehook, or opening on the housing.

In another embodiment, a holding mechanism is provided for locking or retaining the retractable cord in an extended position to allow cleaning of the eyewear without having to maintain tension by continuing to apply force to the retractable cord.

In yet another preferred embodiment, the present invention provides an eyewear cleaning device having a fluid cleaning dispenser. The eyewear cleaning device includes a housing to which a fastener is connected for attaching the device to an article of clothing or some other object. A retractable cord is extendable from the housing, which includes an automatic retractable cord mechanism for automatically retracting the cord. At the end of the cord is attached a nonabrasive cloth or chamois for cleaning eyewear.

In one embodiment, the fluid cleaning dispenser is removably attached to the housing. In another embodiment, the fluid cleaning dispenser is an integral part of the housing. In either case, the dispenser may be located within or external to the housing.

In yet another embodiment, attached to one end of the retractable cord is a clip or other fastening device to allow the retractable cord to be attached to an item of clothing or other object. In this embodiment, attached to the housing is a soft, nonabrasive cloth or chamois. Instead of the nonabrasive cloth being extended from the housing along the retractable cord, both the housing and the chamois are extended from the position of attachment of the end of the cord to some object. In a preferred embodiment, the nonabrasive cloth is removably attached to the housing. More preferably, the method of attachment is by a cloth fastener such as a clip or ring.

A method of cleaning eyewear is also disclosed which involves providing an eyewear cleaning device having a housing and a fastener for attaching the housing to an article of clothing or some other object. A retractable cord is extendable from the housing, which includes an automatic retractable cord mechanism for automatically retracting the cord. At the end of the cord is attached a nonabrasive cloth or chamois for cleaning eyewear. The user attaches the housing to a remote object and then extends the nonabrasive cloth from the housing as it is attached to the retractable cord. The user can then clean the eyewear and release the cloth to allow it to be automatically retracted to the housing. A holding mechanism may be provided with the eyewear cleaning device such that the cord does retract until the holding mechanism, engaged to hold the retractable cord in an extended position, is released.

In another embodiment, the method described may include dispensing cleaning fluid from a cleaning fluid dispenser integral or removably attached to the housing to assist in the cleaning process.

DETAILED DESCRIPTION

Figure 1:
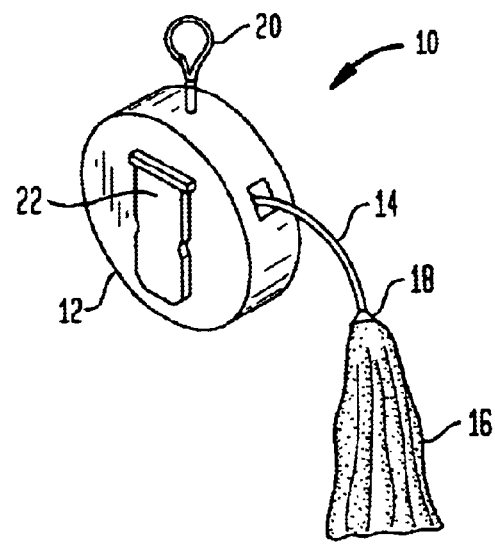
FIG. 1 is a back perspective view of an eyewear cleaning device according to one embodiment of the invention.

The present invention solves many of the above-identified problems associated with cleaning one's eyewear, such as sunglasses, eyeglasses, work goggles and ski goggles, by providing an apparatus that will prevent the loss of the eyewear cleaner and allow ready access thereto. Namely, in one aspect of the present invention, shown in FIG. 1, there is provided an eyewear cleaning device, generally denoted as 10, which includes a housing 12. The housing includes an interior, which houses a retractable cord 14 and an automatic cord winding mechanism (not shown). The housing may simply be a base or support upon which an automatic cord winding mechanism is mounted, and to which a fastener may be attached. The housing is made preferably of a lightweight, material, such as plastic, but may also be made of of metal or a combination of metal and plastic. The housing may be any one of a variety of shapes, sizes and colors.

Attached to one end of the retractable cord is a lens-cleaning nonabrasive cloth or chamois 16 attached to the retractable cord 14 by a cloth fastener 18. The cord may be any flexible type of string, cord or wire suitable for use with an automatic retracting mechanism. The length of the retractable cord may vary. Preferably, the retractable cord is between one and three feet long.

The cloth fastener 18 can comprise a clip or fastening device such as an alligator clip, safety pin, ring, Velcro, etc. that allows the cloth to be firmly retained, but removable for replacement or cleaning of the cloth. The cloth fastener also prevents the cord from retracting fully into the housing. In other embodiments, a knot or small rubber or plastic element may be provided to prevent the retractable cord from retracting fully within the housing.

The nonabrasive cloth may vary in size depending on the eyewear to be cleaned, for example, a larger cloth may be provided for use with work or ski goggles, while a smaller cloth may be provided for use with prescription glasses, reading glasses or sunglasses. The texture and softness of the cloth may also vary according to conditions of use. It is contemplated that various sizes and types of cloths could be provided that are interchangeable with the eyewear cleaning device.

Attached to the outside of the housing 12 is a fastener 20 to allow the device to be readily attachable and removable to an object that will carry eyewear cleaner 10. A belt clip fastener 22 can also be provided for attachment to a belt, pocketbook, jacket pocket, pair of pants or shorts, etc. The fastener 20 can be adapted to attach to an item not worn by the user, but is nearby the user when the user needs to clean his or her glasses. Such items could include, for example, a knob or lever in an automobile, a dashboard, a helmet or hat, a duffle bag being toted to the beach, a bicycle handle or frame, a camera case or strap, etc. Other types of suitable fasteners may include a hook, eyehook, magnet, Velcro or adhesive tape. A fastener may also consist of a protrusion either attached or integral to the housing. Another fastener may include simply an opening on the housing.

As demonstrated in FIGS. 1 and 6–8, more than one fastener may be used with a single eyewear cleaning device.

This provides for a wider range of possible points of attachment, and thus a greater range of useful situations where the device may be used.

The retractable cord 14 of FIG. 1 winds around a spool of the cord winding mechanism inside housing 12, which is operative to automatically retract the cord. Such mechanisms are well-known and can include various tension springs and stop mechanisms to allow the cord to be pulled out, retracted and maintained at any desired retracted position.

Figure 2:
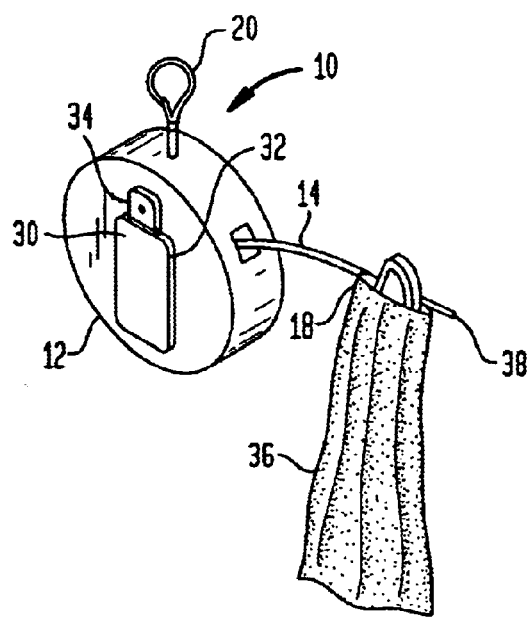
FIG. 2 is a front perspective view of an eyewear cleaning device according to another embodiment of the invention illustrating a detachable cleaning fluid dispenser and a pocket or pouch chamois.

In one embodiment, the lens-cleaning chamois 16 is preferably of the type where it can clean the eyewear without the need for a separate cleaning fluid. Alternatively, as shown in FIG. 2, a small bottle of fluid, such as dispenser 30, can be removably attached to the housing such as by snapping it into place into press-fit indentation 32 provided on the housing. The dispenser 30 can be a pump bottle, which sprays cleaning fluid by pressing on the pump nozzle head 34. The bottle can also be stored within the housing in a separate compartment. Alternatively, the fluid dispenser may be integral to the housing, having a removable cap or plug for refilling the dispenser.

The cleaning fluid may be of any type suitable for the cleaning of eyewear, and may differ depending on conditions of use. The cleaning fluid may consist merely of water. The fluid may be colored so that it is easier to detect the level of fluid remaining. For internal fluid dispensers, a transparent element may be provided in the housing to view the amount of fluid remaining.

As also shown in FIG. 2, the chamois can be formed in the shape of a pocket or pouch 36 to hold a pair of glasses or goggles. To ensure the glasses or goggles stay within the pouch, a pull string 38 can be provided. Alternatively, the top opening can include an elastic band, Velcro, etc. to keep the pouch closed. Other forms of holders, such as hooks, eyehooks, bands or openings in the housing may provide storage for eyewear to prevent eyewear from being misplaced, and to free the users hands for engaging in some activity.

Figure 3:
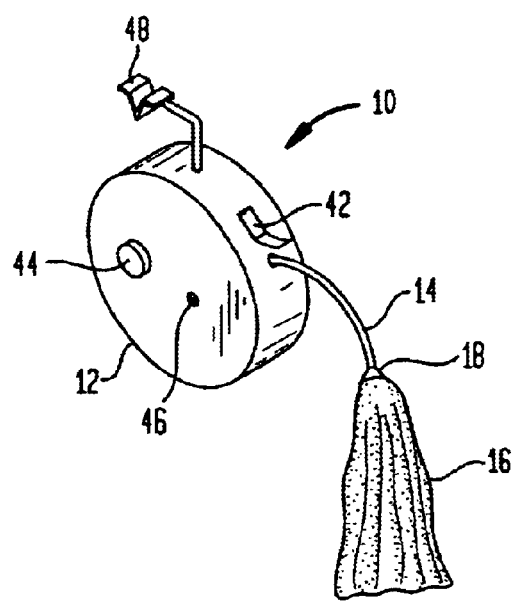
FIG. 3 is a back perspective view of an eyewear cleaning device according to another aspect of the invention illustrating an integral cleaning fluid dispenser and a crevice fastener.

In another embodiment, shown in FIG. 3, the housing 12 can include an integral cleaning fluid dispenser, here shown with a separate chamber (not shown) within housing 12 for holding cleaning fluid. The cleaning fluid can be added to the chamber via an inlet 42 and then sprayed out of nozzle 46 by depressing pump button 44.

Moreover, as shown in FIG. 3, the fastener can comprise a crevice fastener adapted to fit snuggly into a crack or small opening, such as the seam or crevice normally found on dashboards of cars. Such a fastener can allow ready access to sunglasses or the like in an automobile when driving.

Figure 4:
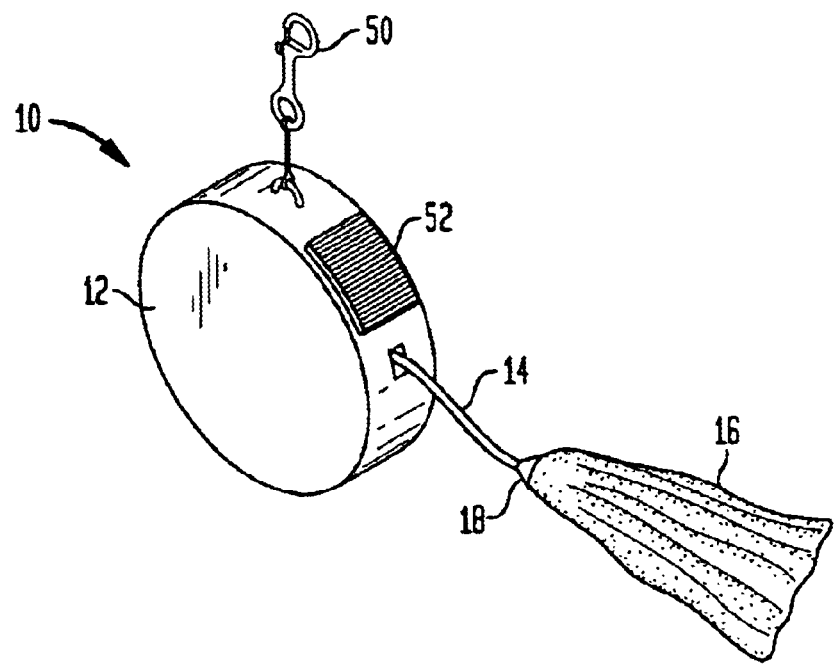
FIG. 4 is a back perspective view of an eyewear cleaning device according to yet another aspect of the invention including a holding or locking mechanism to retain the cord at a desired length.

In another embodiment, shown in FIG. 4, a different type of clip fastener 50, is illustrated. The housing 12 can include a locking mechanism (not shown) manually operated by a sliding switch 52. The locking mechanism serves to lock or retain the cord in an extended position at the desired length to allow the user to clean eyewear without having to provide constant pulling force or tension on the cord during cleaning. Other locking or holding methods including a mechanism similar to that used with window blinds or a simple catch located on the housing are also contemplated. Alternatively, a sliding element may be provided on the cord to hold the cord in a fixed position.

Figure 5:
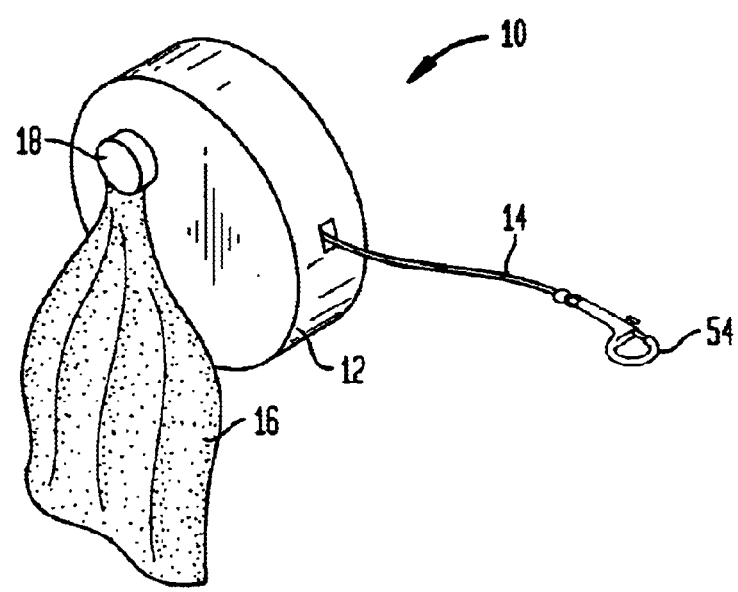
FIG. 5 is a front perspective view of an eyewear cleaning device according to another embodiment of the invention whereby a chamois is attached to the housing and a fastener is provided at the end of the cord.

In another embodiment, shown in FIG. 5, the housing 12 is attached directly to the nonabrasive cloth 16 via a cloth fastener 18. While the retractable cord 14, is attached to a fastener, clip 54. Thus, instead of the housing 12 remaining stationary as in previous embodiments disclosed, the housing 12 and the cloth 16 are moved together as retractable cord 14 is extended.

Figure 6:
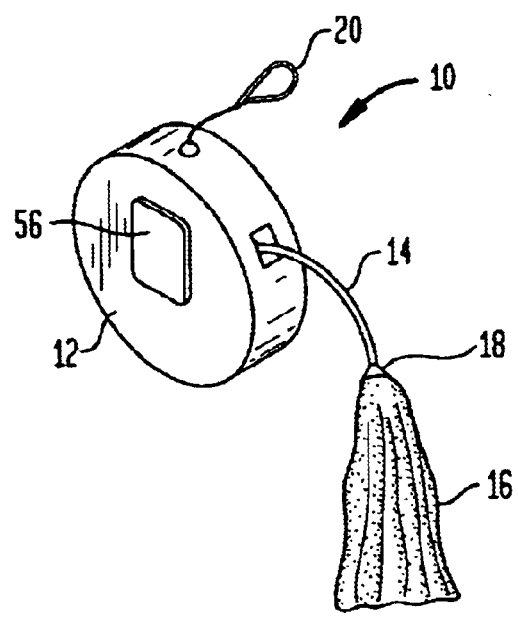
FIG. 6 is a back perspective view of an eyewear cleaning device according to another aspect of the invention illustrating a magnet fastener.
Figure 7:
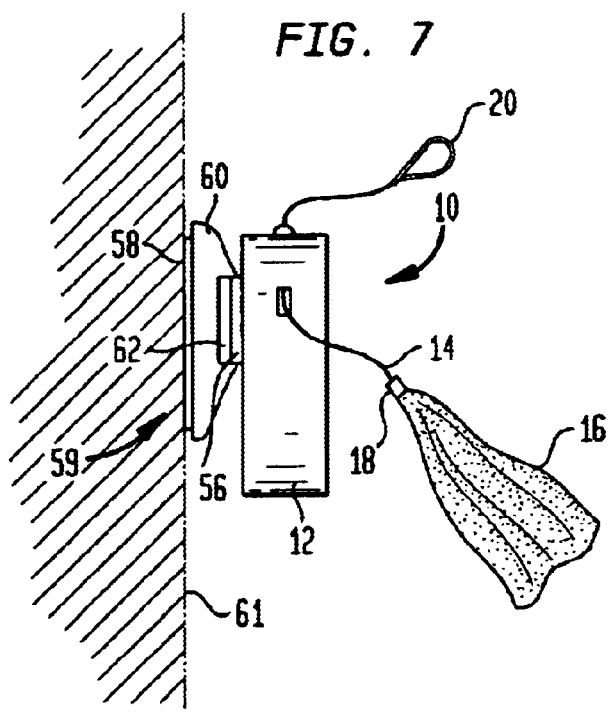
FIG. 7 is a side view of an eyewear cleaning device illustrating the magnet engaging a support element.

In another embodiment, shown in FIG. 6, a clip fastener 20 is shown in conjunction with a magnetic fastener 56. FIG. 7 shows the eyewear cleaning device 10 of FIG. 6 in conjunction with a fastener support element 59. Fastener support element 59 consists of a metal plate 62, which engages the magnetic fastener 56 attached to the back of the eyewear cleaning device 10. The metal plate is attached to a support base 60, which is connected to a surface 61 by an adhesive strip 58. In another embodiment, the magnetic strip may be provided on the support element for engaging a metallic housing or metallic portion of a housing.

Figure 8:
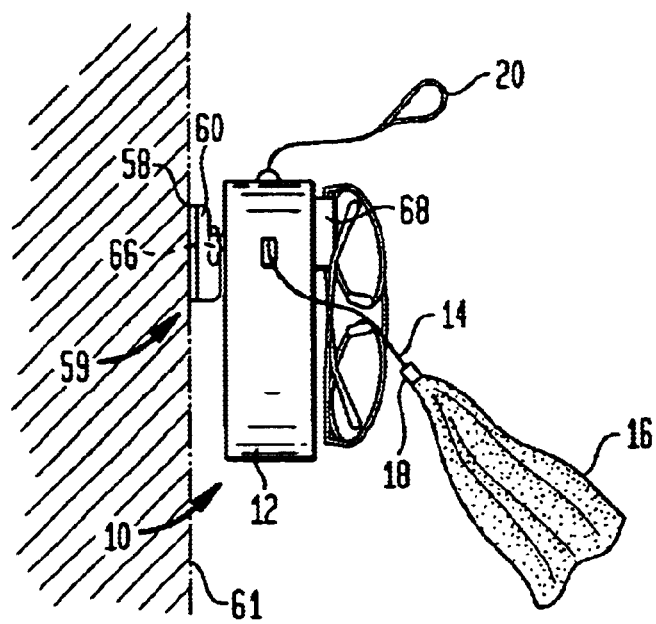
FIG. 8 is a side view of an eyewear cleaning device illustrating a protrusion designed to engage a support element.

In another embodiment, shown in FIG. 8, a clip fastener 20, is shown in conjunction with a fastening protrusion 66 of the housing 12. The protrusion 66 engages the support element 59 which consists of a support base 60 attached to a surface 61 via an adhesive strip 58. Also shown is an eyewear holder 68 of housing 12.

Figure 9:
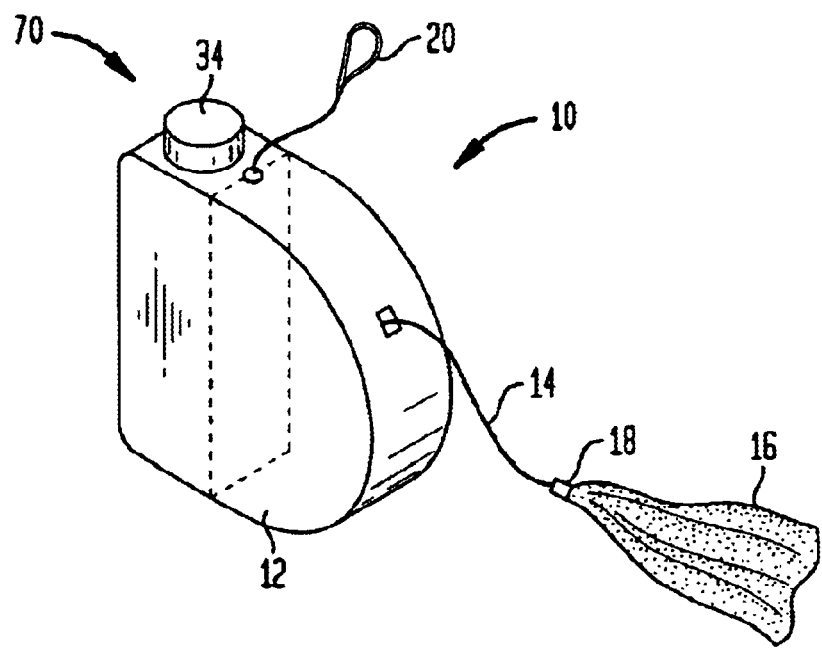
FIG. 9 is a front perspective view of an eyewear cleaning device according to yet another aspect of the invention illustrating an integral cleaning fluid dispenser.

In FIG. 9, another embodiment shows an integral dispensing element 70 of which only the cap pump nozzle 34 is shown. The cap may be removed to refill the dispensing element 70 with cleaning fluid. In another embodiment, the dispenser shown may be slidably removed from the housing.

When wearing glasses or sunglasses during sports activity, for example, the eyewear cleaner 10 is preferably attached to a garment, such as on one's shorts or on a belt, and the cord 14 is kept in the retracted position. When the eyewear needs cleaning, the cloth is retracted by the user to a length that the user needs and the glasses are removed and cleaned. In a preferred aspect, the cord can be made long enough to allow cleaning of lenses (such as the front face of the lenses) without the need to even remove the eyewear. If the lenses are particularly dirty, in the embodiments of FIGS. 2 and 3, a lens cleaning solution can be used by detaching the spray bottle 30 (FIG. 2) or by pressing on pump button 44 (FIG. 3) to release a mist of cleaning fluid onto the chamois or the glasses.

Because the chamois is attached to the eyewear cleaner 10, which in turn is attached to readily accessible location (such as on one's body, on a bike, in a car, etc.), the chamois will not be lost and can easily be used. Moreover, since the cord 14 is retractable, the chamois will be kept out of the way when not in use and will not hang or dangle in they way of the user.

These and other variations and combinations of features discussed above can be utilized without departing from the present invention. Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. An eyewear cleaning device comprising:
   (a) a housing comprising an eyewear holding element;
   (b) a fastener connected to said housing;
   (c) a retractable cord having an end extendable from said housing;
   (d) an automatic retractable cord mechanism for automatically retracting said retractable cord into said housing; and (e) a nonabrasive cloth attached to the end of said retractable cord for cleaning eyewear.

2. The eyewear cleaning device of claim 1, wherein said nonabrasive cloth is removably attached to said end of said retractable cord.

3. The eyewear cleaning device of claim 2, wherein said end of said retractable cord includes a cloth fastener for removable attachment of said nonabrasive cloth.

4. The eyewear cleaning device of claim 1, wherein said fastener comprises a clip.

5. The eyewear cleaning device of claim 1, wherein said fastener comprises a magnet.

6. The eyewear cleaning device of claim 5, wherein said magnet is adapted to engage a support element.

7. The eyewear cleaning device of claim 1, wherein said fastener comprises a hook.

8. The eyewear cleaning device of claim 1, wherein said fastener comprises a crevice fastener.

9. The eyewear cleaning device of claim 1, wherein said fastener comprises an opening for receiving a support element.

10. The eyewear cleaning device of claim 1, wherein said fastener comprises a protrusion for engaging a support element.

11. An eyewear cleaning comprising:
(a) a housing comprising an eyewear holding element;
(b) a fastener connected to said housing;
(c) a retractable cord having an end extendable from said housing;
(d) an automatic retractable cord mechanism for automatically retracting said retractable cord into said housing; and
(e) a nonabrasive cloth attached to the end of said retractable cord for cleaning eyewear, said nonabrasive cloth comprising a pouch for holding said eyewear.

12. An eyewear cleaning device comprising:
(a) a housing comprising an eyewear holding element;
(b) a crevice fastener connected to said housing for securing said housing to a location having a crevice by insertion of said crevice fastener into the crevice;
(c) a retractable cord having an end extendable from said housing;
(d) an automatic retractable cord mechanism for automatically retracting said retractable cord into said housing; and
(e) a nonabrasive cloth attached to the end of said retractable cord for cleaning eyewear.

13. The eyewear cleaning device of claim 12, wherein said nonabrasive cloth is removably attached to said end of said retractable cord.

14. The eyewear cleaning device of claim 13, wherein said end of said retractable cord includes a cloth fastener for removable attachment of said nonabrasive cloth.

15. An eyewear cleaning comprising:
(a) a housing;
(b) a crevice fastener connected to said housing for securing said housing to a location having a crevice by insertion of said crevice fastener into the crevice;
(c) a retractable cord having an end extendable from said housing;
(d) an automatic retractable cord mechanism for automatically retracting said retractable cord into said housing; and
(e) a nonabrasive cloth attached to the end of said retractable cord for cleaning eyewear, said nonabrasive cloth comprising a pouch for holding said eyewear.

16. An eyewear cleaning device comprising:
(a) a housing comprising an eyewear holding element;
(b) a fastener connected to said housing;
(c) a retractable cord having an end extendable from said housing;
(d) an automatic retractable cord mechanism for automatically retracting said retractable cord into said housing;
(e) a holding mechanism for retaining said retractable cord in a given extended position; and
(f) a nonabrasive cloth attached to said end of said retractable cord for cleaning eyewear.

17. The eyewear cleaning device of claim 16, wherein said nonabrasive cloth is removably attached to said end of said retractable cord.

18. The eyewear cleaning device of claim 17, wherein said end of said retractable cord includes a cloth fastener for removable attachment of said nonabrasive cloth.

19. The eyewear cleaning device of claim 16, wherein said fastener comprises a clip.

20. The eyewear cleaning device of claim 16, wherein said fastener comprises a magnet.

21. The eyewear cleaning device of claim 20, wherein said magnet is adapted to engage a support element.

22. The eyewear cleaning device of claim 16, wherein said fastener comprises a hook.

23. The eyewear cleaning device of claim 16, wherein said fastener comprises a crevice fastener.

24. The eyewear cleaning device of claim 16, wherein said fastener comprises an opening for receiving a support element.

25. The eyewear cleaning device of claim 16, wherein said fastener comprises a protrusion for engaging a support element.

26. An eyewear cleaning device comprising:
(a) a housing;
(b) a fastener connected to said housing;
(c) a retractable cord having an end extendable from said housing;
(d) an automatic retractable cord mechanism for automatically retracting said retractable cord into said housing;
(e) a holding mechanism for retaining said retractable cord in a given extended position; and
(f) a nonabrasive cloth attached to said end of said retractable cord for cleaning eyewear, said nonabrasive cloth comprising a pouch for holding said eyewear.

27. An eyewear cleaning device comprising:
(a) a housing including a fluid dispenser adapted to dispense a supply of eyewear cleaning fluid;
(b) a fastener connected to said housing;
(c) a retractable cord having an end extendable from said housing;
(d) an automatic retractable cord mechanism for automatically retracting said retractable cord into said housing; and
(e) a nonabrasive cloth attached to said end of said retractable cord for cleaning eyewear.

28. The eyewear cleaning device of claim 27, wherein said nonabrasive cloth is removably attached to said end of said retractable cord.

29. The eyewear cleaning device of claim 28, wherein said end of said retractable cord includes a cloth fastener for removable attachment of said nonabrasive cloth.

30. The eyewear cleaning device of claim 27, wherein said fastener comprises a crevice fastener.

31. The eyewear cleaning device of claim 27, wherein said housing further comprises an eyewear holding element.

32. The eyewear cleaning device of claim 27, wherein said nonabrasive cloth comprises a pouch for holding said eyewear.

33. The eyewear cleaning device of claim 27, wherein said fluid dispenser is located within said housing.

34. The eyewear cleaning device of claim 27, wherein said fluid dispenser comprises a dispenser removably attached to said housing.

35. An eyewear cleaning device comprising:
   (a) a housing comprising a fluid dispenser adapted to dispense a supply of eyewear cleaning fluid;
   (b) a nonabrasive cloth for cleaning eyewear attached to said housing;
   (c) a retractable cord having an end extendable from said housing;
   (d) an automatic retractable cord mechanism for automatically retracting said retractable cord into said housing; and
   (e) a fastener connected to said end of said retractable cord.

36. The eyewear cleaning device of claim 35, wherein said nonabrasive cloth is removably attached to said housing.

37. The eyewear cleaning device of claim 36, wherein said housing includes a cloth fastener for removable attachment of said nonabrasive cloth.

38. The eyewear cleaning device of claim 35, wherein said fluid dispenser is located within said housing.

39. The eyewear cleaning device of claim 35, wherein said fluid dispenser comprises a dispenser removably attached to said housing.

40. A method of cleaning eyewear comprising:
   (a) providing an eyewear cleaning device having a housing, a fastener connected to said housing, a retractable cord having an end extendable from said housing; an automatic retractable cord mechanism, and a nonabrasive cloth attached to said end of said cord;
   (b) attaching said housing to a remote object by said fastener;
   (c) extending said nonabrasive cloth from said housing from a first, retracted position to a second, extended position;
   (d) cleaning the eyewear with said nonabrasive cloth when in said second extended position; and
   (e) releasing said nonabrasive cloth to enable said cloth to automatically return to the first retracted position by actuating the retractable cord mechanism.

41. The method of claim 40, wherein said automatic retractable cord mechanism is actuated automatically upon release of said nonabrasive cloth.

42. The method of claim 40, further comprising locking said retractable cord in an extended position and actuating said automatic retractable cord mechanism automatically upon release of said retractable cord.

43. The method of claim 40, further comprising dispensing cleaning fluid from a dispenser attached to said housing.

44. The method of claim 40, wherein said fastener comprises a crevice fastener, and further comprising attaching sing to a remote object by inserting said crevice fastener to a crevice on said remote object.

* * * * *

UNITED STATES PATENT AND TRADEMARK OFFICE
CERTIFICATE OF CORRECTION

PATENT NO.   : 6,881,273 B1
DATED        : April 19, 2005
INVENTOR(S)  : Charles D. Oberman It is certified that error appears in the above-identified patent and that said Letters Patent is hereby corrected as shown below:

Title page,
Item [57], ABSTRACT,
Line 1, "provides" should read -- provide --.

Column 1,
Line 7, "is" should read -- are --.
Line 24, "other" should read -- another --.

Column 4,
Line 23, delete the word "of" (second occurrence).

Column 5,
Line 39, "user" should read -- user's --
Line 66, "18. While"should read -- 18, while --.
Line 66, "14," should read -- 14 --.

Column 6,
Line 16, "20," should read -- 20 --.
Line 46, "they" should read -- the --.

Column 7,
Lines 24 and 54, after "cleaning" insert -- device --.

Column 10,
Line 30, "sing" should read -- said housing --.
Line 30, "to" (second occurrence) should read -- into --.

Signed and Sealed this

Twelfth Day of July, 2005

JON W. DUDAS
*Director of the United States Patent and Trademark Office*